(12) United States Patent
Chen et al.

(10) Patent No.: US 12,240,470 B1
(45) Date of Patent: Mar. 4, 2025

(54) METHOD FOR DRIVING BEHAVIOR MODELING BASED ON SPATIO-TEMPORAL INFORMATION FUSION

(71) Applicant: Jilin University, Changchun (CN)

(72) Inventors: Hong Chen, Changchun (CN); Huihua Gao, Changchun (CN); Ting Qu, Changchun (CN); Yunfeng Hu, Changchun (CN); Xun Gong, Changchun (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 18/904,250

(22) Filed: Oct. 2, 2024

(30) Foreign Application Priority Data

Aug. 5, 2024 (CN) .......................... 202411059841.X

(51) Int. Cl.
*B60W 40/09* (2012.01)
*B60W 60/00* (2020.01)
*G06N 3/0442* (2023.01)

(52) U.S. Cl.
CPC ........ *B60W 40/09* (2013.01); *B60W 60/0027* (2020.02); *G06N 3/0442* (2023.01)

(58) Field of Classification Search
None
See application file for complete search history.

(56) References Cited

U.S. PATENT DOCUMENTS

| | | | | |
|---|---|---|---|---|
| 11,256,983 B2* | 2/2022 | Ogale | ................. | G05D 1/0221 |
| 11,507,093 B2* | 11/2022 | Kang | .................. | G05D 1/0221 |
| 11,687,087 B2* | 6/2023 | Choi | ..................... | G01S 17/931 |
| | | | | 701/28 |
| 11,886,199 B2* | 1/2024 | Qi | .......................... | G08G 1/163 |
| 11,975,726 B1* | 5/2024 | Gu | .......................... | G06N 3/044 |
| 2022/0229954 A1* | 7/2022 | Mittal | ..................... | G06F 30/20 |
| 2024/0362923 A1* | 10/2024 | Xu | ......................... | G06V 20/56 |

\* cited by examiner

*Primary Examiner* — James J Lee
*Assistant Examiner* — David Hatch
(74) *Attorney, Agent, or Firm* — Reising Ethington P.C.

(57) ABSTRACT

Provided is a method for driving behavior modeling based on spatio-temporal information fusion, relating to the field of driving behavior simulations. The method includes: constructing a driving behavior model, where the driving behavior model includes a spatial information encoding network, a temporal information encoding network, a feature fusion network, and a feature decoding network, with the feature fusion network being connected to both the spatial information encoding network and the temporal information encoding network, and the feature decoding network being connected to the feature fusion network; determining a future trajectory sequence of a target main vehicle at future time points based on the trained driving behavior model according to spatial information and temporal information of the target main vehicle, where the target main vehicle is controlled to travel according to the future trajectory sequence at the future time points.

10 Claims, 4 Drawing Sheets

METHOD FOR DRIVING BEHAVIOR MODELING BASED ON SPATIO-TEMPORAL INFORMATION FUSION

CROSS-REFERENCE TO RELATED APPLICATIONS

This patent application claims the benefit and priority of Chinese Patent Application No. 202411059841.X, filed with the China National Intellectual Property Administration on Aug. 5, 2024, the disclosure of which is incorporated by reference herein in its entirety as part of the present application.

TECHNICAL FIELD

The present disclosure relates to the field of driving behavior simulation, and in particular, to a method for modeling driving behavior based on spatio-temporal information fusion.

BACKGROUND OF THE INVENTION

Due to its advantages of efficiency, safety, repeatability, and low cost, virtual simulation technology has become one of the key technologies driving the development of safety testing for autonomous driving. Human drivers, as the primary participants in traffic, directly influence the behavior decision-making of autonomous vehicles. Therefore, a driving behavior model is essential for creating a high-fidelity virtual simulation testing environment. However, insufficient realism and intelligence in driving behavior models have made it difficult to narrow the gap between virtual simulation testing environments and real driving conditions. This has become a significant bottleneck restricting the further application of virtual simulation technology in the development and testing of autonomous driving systems. Driving scenarios contain rich and multi-modal data, including various sources of information such as spatial and temporal data. Such data provides more comprehensive information for driving behavior models, enhancing their ability to understand driving scenarios. Nevertheless, there are considerable differences between data in different modalities, making effective feature encoding and fusion critical for fully understanding driving scenarios and improving the performance of driving behavior models.

SUMMARY OF THE INVENTION

An objective of the present disclosure is to provide a method for driving behavior modeling based on spatio-temporal information fusion, allowing a driving behavior model to have a better understanding of driving scenarios, thereby enhancing trajectory control accuracy of vehicles.

To achieve the above objective, the present disclosure provides the following solutions:

According to a first aspect, the present disclosure provides a method for driving behavior modeling based on spatio-temporal information fusion, which includes:

obtaining a training sample set, where each training sample in the training sample set includes spatial sample information, temporal sample information, and a real trajectory sequence of a sample main vehicle;

constructing a driving behavior model, where the driving behavior model includes a spatial information encoding network, a temporal information encoding network, a feature fusion network, and a feature decoding network; the feature fusion network is connected to both the spatial information encoding network and the temporal information encoding network, and the feature decoding network is connected to the feature fusion network;

training the driving behavior model based on the training sample set to obtain a trained driving behavior model; and determining a future trajectory sequence of a target main vehicle at future time points based on the trained driving behavior model according to spatial information and temporal information of the target main vehicle, where the target main vehicle is controlled to travel according to the future trajectory sequence at the future time points; the spatial information includes a plurality of elements that contain lane markings, a historical trajectory of the target main vehicle, and historical trajectories of background vehicles; and the temporal information includes the historical trajectory of the target main vehicle and the historical trajectories of the background vehicles.

According to specific embodiments provided in the present disclosure, the present disclosure discloses the following technical effects:

The present disclosure provides a method for driving behavior modeling based on spatio-temporal information fusion, where a driving behavior model includes a spatial information encoding network, a temporal information encoding network, a feature fusion network, and a feature decoding network. By encoding and fusing spatial information and temporal information in driving scenarios, the method allows the driving behavior model to have a better understanding of driving scenarios. A future trajectory sequence determined by the driving behavior model is more accurate, which can better guide a target main vehicle to travel, thereby accurately replicating human driving behavior and, in turn, improving the trajectory control accuracy of the target main vehicle.

BRIEF DESCRIPTION OF DRAWINGS

To describe the technical solutions in the embodiments of the present disclosure or in the prior art more clearly, the following briefly describes the accompanying drawings required for the embodiments. Apparently, the accompanying drawings in the following description show merely some embodiments of the present disclosure, and a person of ordinary skill in the art may still derive other accompanying drawings from these accompanying drawings without creative efforts.

DETAILED DESCRIPTION OF THE INVENTION

The technical solutions in the embodiments of the present disclosure are clearly and completely described below with reference to the drawings in the embodiments of the present disclosure. Apparently, the described embodiments are only some rather than all of the embodiments of the present disclosure. All other embodiments obtained by a person of ordinary skill in the art based on the embodiments of the present disclosure without creative efforts shall fall within the protection scope of the present disclosure.

To make the above objectives, features, and advantages of the present disclosure more obvious and easy to understand, the present disclosure will be further described in detail with reference to the accompanying drawings and specific implementations.

Figure 1:
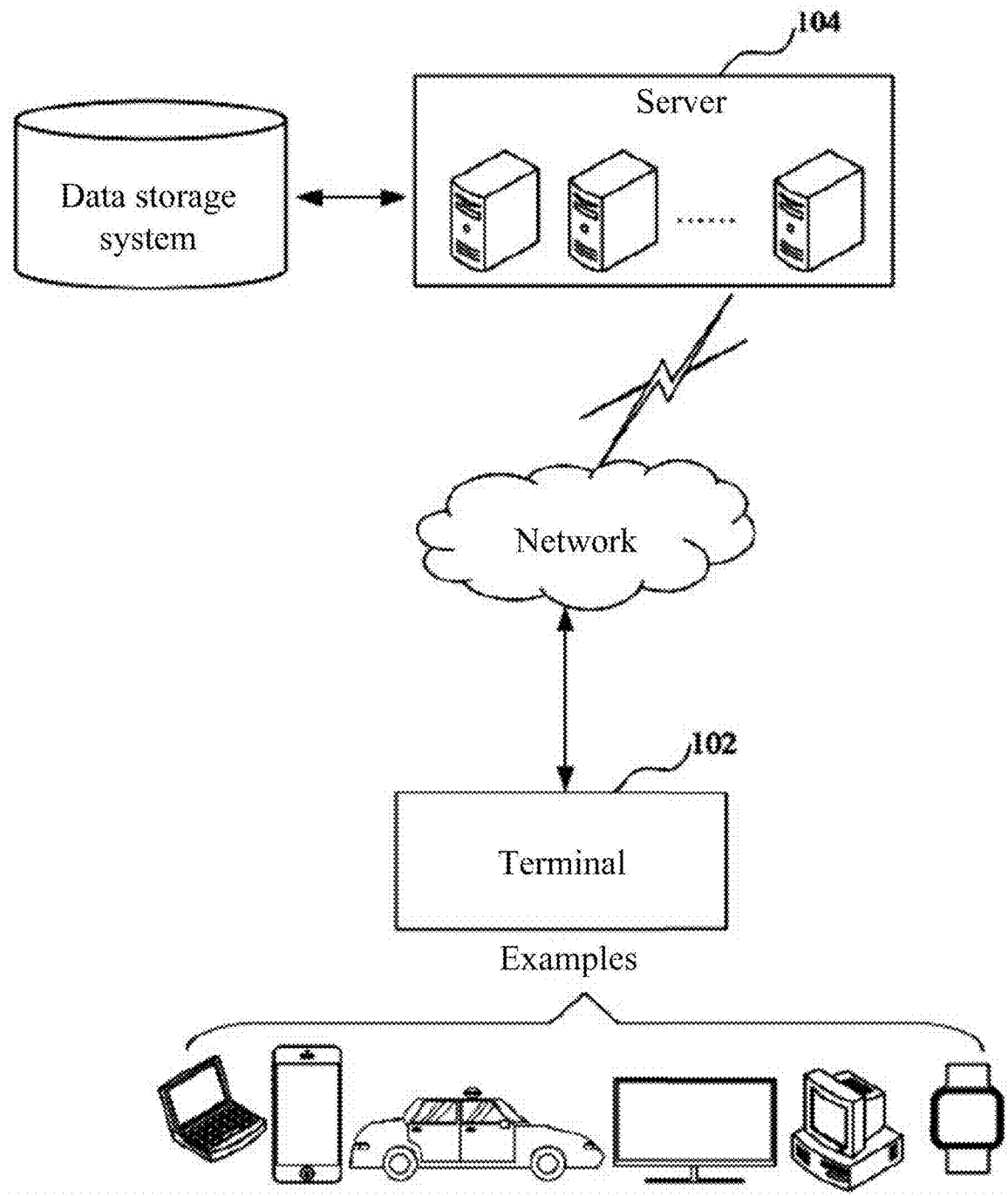
FIG. 1 is a diagram of an application environment of a method for driving behavior modeling based on spatio-temporal information fusion according to an embodiment of the present disclosure.

A method for driving behavior modeling based on spatio-temporal information fusion provided by an embodiment of the present disclosure can be applied to the application environment shown in FIG. 1. A terminal 102 communicates with a server 104 via a network. A data storage system can store data that the server 104 needs to process. The data storage system can be independently set up, integrated with the server 104, or placed in the cloud or on other servers. The terminal 102 can send spatial information and temporal information in a driving scenario to the server 104. Upon receiving the spatial information and the temporal information in the driving scenario, the server 104 constructs a driving behavior model based on the spatial information and the temporal information in the driving scenario, and predicts a future trajectory sequence of a main vehicle based on the driving behavior model. The server 104 can feed back the obtained future trajectory sequence of the main vehicle to the terminal 102. Furthermore, in some embodiments, the method for driving behavior modeling based on spatio-temporal information fusion can also be implemented solely by the server 104 or the terminal 102. For example, the terminal 102 can directly conduct driving behavior modeling based on the spatial information and temporal information in the driving scenario, or the server 104 can retrieve the spatial information and temporal information in the driving scenario from the data storage system for driving behavior modeling.

The terminal 102 can be, but is not limited to, various desktop computers, laptops, smartphones, tablets, Internet of Things (IoT) devices, and portable wearable devices. The IoT device may be a smart speaker, a smart TV, a smart air conditioner, a smart in-vehicle device, or the like. The portable wearable device can be a smart watch, a smart band, a head-mounted device, or the like. The server 104 can be implemented using a standalone server, a server cluster consisting of a plurality of servers, or a cloud server.

Figure 2:
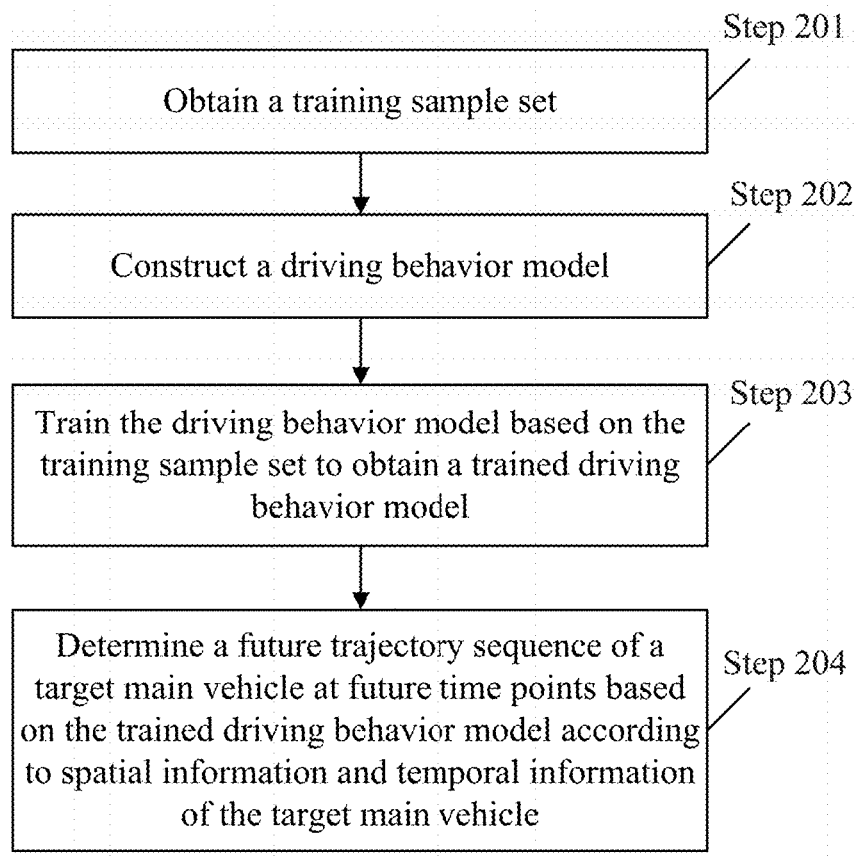
FIG. 2 is a schematic flowchart of a method for driving behavior modeling based on spatio-temporal information fusion according to an embodiment of the present disclosure.

In an exemplary embodiment, as shown in FIG. 2, a method for driving behavior modeling based on spatio-temporal information fusion is provided, which is executed by a computer device. The method can be executed solely by a terminal or a server, or jointly by a terminal and a server. In this embodiment of the present disclosure, the method being applied on the server 104 in FIG. 1 is taken as an example for description, including step 201 to step 204 as follows:

Step 201: Obtain a training sample set. Each training sample in the training sample set includes spatial sample information, temporal sample information, and a real trajectory sequence of a sample main vehicle.

Step 202: Construct a driving behavior model.

In the present disclosure, the driving behavior model includes a spatial information encoding network, a temporal information encoding network, a feature fusion network, and a feature decoding network. The feature fusion network is connected to both the spatial information encoding network and the temporal information encoding network, and the feature decoding network is connected to the feature fusion network.

Step 203: Train the driving behavior model based on the training sample set to obtain a trained driving behavior model.

Step 204: Determine a future trajectory sequence of a target main vehicle at future time points based on the trained driving behavior model according to spatial information and temporal information of the target main vehicle, where the target main vehicle is controlled to travel according to the future trajectory sequence at the future time points.

The spatial information includes a plurality of elements that contain lane markings, a historical trajectory of the target main vehicle, and historical trajectories of background vehicles. The temporal information includes the historical trajectory of the target main vehicle and the historical trajectories of the background vehicles. The historical trajectory includes the position and speed at each time point.

In a specific example, the sample main vehicle and the target main vehicle can be real vehicles or virtual vehicles in a virtual simulation platform. The sample main vehicle can be an autonomous vehicle or a manually driven vehicle. The target main vehicle is an autonomous vehicle.

When the sample main vehicle is a real vehicle, the driving behavior model is trained based on spatial information and temporal information of vehicles in real driving scenarios. When the sample main vehicle is a virtual vehicle, the driving behavior model is trained based on spatial information and temporal information of vehicles in a virtual simulation testing environment.

When the target main vehicle is a real vehicle, the driving behavior model provided in the present disclosure is applied in a real driving scenario. Based on spatial information and temporal information of the target main vehicle in the real driving scenario, a future trajectory sequence of the target main vehicle is determined using the driving behavior model provided in the present disclosure, thereby automatically controlling the driving trajectory of the target main vehicle to improve the accuracy and safety of autonomous vehicles in real driving scenarios. When the target main vehicle is a virtual vehicle, the trained driving behavior model is connected to a virtual simulation platform to determine a future trajectory sequence of the target main vehicle at future time points. The virtual simulation platform controls the target main vehicle to travel according to the future trajectory sequence at the future time points.

Specifically, the virtual simulation platform can be any simulation software, such as the Tencent Autonomous Driving Simulation (TAD Sim) testing platform. Any appropriate simulation software can be selected based on actual needs. In TAD Sim testing platform, a virtual simulation testing environment for autonomous vehicles is constructed, where lane markings, a target main vehicle, and background vehicles are set up in the virtual simulation testing environment. Based on spatial information and temporal information of the target main vehicle in the virtual simulation testing environment, a future trajectory sequence of the target main vehicle is determined using the driving behavior model provided in the present disclosure, thereby automatically controlling a driving trajectory of the target main vehicle in the virtual simulation testing environment. The operational state of the autonomous vehicle is simulated in a virtual environment, providing a safety foundation for subsequent deployment of autonomous vehicles in real driving scenarios.

In an exemplary embodiment, step 204 includes step (1) to step (4).

Step (1): Encode the spatial information using the spatial information encoding network, to obtain spatial features. The spatial information encoding network is constructed based on a multilayer perceptron, max pooling aggregation operations, and a self-attention mechanism.

Spatial information, such as road structure and the spatial situation of background vehicles, is an important factor influencing driving behavior. Therefore, encoding the spatial information is one of the keys to improving the accuracy of the driving behavior model. The present disclosure divides the spatial information into two categories: map elements and trajectory elements. The map elements include lane markings, while the trajectory elements include the historical trajectory of the main vehicle and the historical trajectories of the background vehicles. Each lane marking, the historical trajectory of the main vehicle, and the historical trajectory of each background vehicle in the driving scenario are independently considered as individual elements in the spatial information. Each element in the spatial information is vectorized separately and uniformly described as a polyline subgraph composed of 9 node vectors connected end to end.

Further, step (1) includes step (11) to step (16) as follows:

Step (11): Determine a plurality of node vectors for each element. Each node vector includes a starting position, an ending position, element attributes, and an element index.

Specifically, a plurality of key points are selected according to the lane marking in a vehicle travel direction, to obtain a plurality of node vectors for the lane marking. Based on the historical trajectory of the target main vehicle, a plurality of key points are selected according to the time dimension to determine a plurality of node vectors for the target main vehicle. Based on the historical trajectory of the background vehicle, a plurality of key points are selected according to the time dimension to determine a plurality of node vectors for the background vehicle.

In description of the map elements, 10 key points are uniformly selected according to each lane marking in the vehicle travel direction. In description of the trajectory elements, historical trajectories from the past 5 seconds are selected, with a sampling interval of 0.5 seconds, resulting in the selection of 10 key points according to the time dimension. Consecutive key points are connected to form node vectors.

The node vector of the j-th element is represented as follows:

$$v_{i,j}=[x_{start,i,j},y_{start,i,j},x_{end,i,j},y_{end,i,j},a_j,j];$$

where $v_{i,j} \in \mathbb{R}^{1\times 9}$ represents the i-th node vector in the polyline subgraph of the j-th element, $\mathbb{R}$ represents a set of real numbers, $x_{start,i,j}$ represents the x-coordinate of the starting position of the i-th node vector in the polyline subgraph of the j-th element, $y_{start,i,j}$ represents the y-coordinate of the starting position of the i-th node vector in the polyline subgraph of the j-th element, $x_{end,i,j}$ represents the x-coordinate of the ending position of the i-th node vector in the polyline subgraph of the j-th element, $y_{end,i,j}$ represents the y-coordinate of the ending position of the i-th node vector in the polyline subgraph of the j-th element, and $a_j \in \mathbb{R}^{1\times 4}$ represents the attributes of the j-th element, including five types: main vehicle trajectory, background vehicle trajectories, solid lane markings, dashed lane markings, and virtual vehicle trajectories. The five types are encoded using a one-hot representation. For example, the main vehicle trajectory is represented as 0001, the background vehicle trajectories are represented as 0010, the solid lane markings are represented as 0100, the dashed lane markings are represented as 1000, and the virtual vehicle trajectories are represented as 0000.

Step (12): For any given element, connect the node vectors of the element sequentially to obtain a polyline subgraph of the element. The polyline subgraph of the j-th element is represented as $p_j \in \mathbb{R}^{9\times 7}$, which is a directed multigraph composed of $\{v_{1,j}, v_{2,j}, \ldots v_{9,j}\}$.

Step (13): Based on a multilayer perceptron and max-pooling aggregation operations, extract features from the polyline subgraph of each element to obtain a polyline subgraph feature vector of each element.

To extract features from the polyline subgraph, each polyline subgraph needs to undergo a forward propagation process of a 3-layer subgraph feature extraction network. After that, the output from the last layer of the subgraph feature extraction network undergoes max pooling to represent the spatial element depicted by the polyline subgraph as a one-dimensional polyline subgraph feature vector.

Specifically, the polyline subgraph feature vector of the j-th element is determined using the following formulas:

$$v_{i,j}^{(l)}=\varphi_{rel}(g_{enc}(v_{i,j}^{(l-1)}),\varphi_{agg}(\{g_{enc}(v_{:,j}^{(l-1)})\}));$$

$$\tilde{p}_j=\varphi_{agg}(\{g_{enc}(v_{:,j}^{(3)})\});$$

where $v_{i,j}^{(l)}$ denotes the i-th node vector in the polyline subgraph of the j-th element at the l-th layer of the subgraph feature extraction network; $v_{i,j}^{(l-1)}$ denotes the i-th node vector in the polyline subgraph of the j-th element at the (l−1)-th layer of the subgraph feature extraction network; $v_{:,j}^{(l-1)}$ denotes all node vectors in the polyline subgraph of the j-th element at the l-th layer of the subgraph feature extraction network, where l=1, 2, 3. The node vectors in the polyline subgraph of the j-th element at the 0-th layer of the subgraph feature extraction network are the node vectors in the polyline subgraph of the j-th element, that is, $v_{i,j}^{(0)}=v_{i,j}$; $\tilde{p}_j$ denotes the polyline subgraph feature vector of the j-th element; $g_{enc}(\bullet)$ represents a node encoding network, which is realized by a multilayer perceptron with the same structure but different parameters at each layer of the subgraph feature extraction network; $\varphi_{agg}(\bullet)$ represents max pooling aggregation across all adjacent node vectors, and rel represents a concatenation operation.

Step (14): Concatenate the polyline subgraph feature vectors of all elements to obtain a spatial feature matrix.

In the process of obtaining the polyline subgraph features, only the spatial information of the elements is considered, while global interaction relationships among elements are not taken into account. Therefore, a global graph network needs to be constructed to capture global interaction features. Each polyline subgraph feature is treated as a node in a global graph network.

To fully consider the interaction relationships between each pair of nodes, the global graph network is viewed as a network where all nodes are interconnected. All polyline subgraph feature vectors are concatenated to form a spatial feature matrix $P \in \mathbb{R}^{32 \times 16}$.

Each row of the spatial feature matrix represents the polyline subgraph feature vector of a corresponding element. When the number of elements is less than 32, zero rows are used for padding. It should be noted that the first nine rows of the spatial feature matrix have a fixed order. The first row of the spatial feature matrix is the polyline subgraph feature vector representing the historical trajectory of the main vehicle, while the second to the ninth rows are sequentially polyline subgraph feature vectors from historical trajectories of eight surrounding background vehicles. The eight background vehicles are located at the front left, front right, left side, right side, rear left, rear, and rear right of the main vehicle. The remaining rows of the spatial feature matrix are polyline subgraph feature vectors from the map elements.

Step (15): Extract global interaction features of the spatial feature matrix using a self-attention mechanism, to obtain a spatial interaction feature matrix.

The self-attention mechanism allows each element to interact with other elements and adjust representation based on correlations with other elements. The spatial interaction feature matrix is determined using the following formulas:

$$\tilde{P} = \text{sotfmax}(P_Q P_K^T) P_V;$$

$$P_Q = P W_Q$$

$$P_K = P W_K$$

$$P_V = P W_V$$

where $\tilde{P}$ denotes the spatial interaction feature matrix, softmax(•) denotes an activation function, $P_Q$ denotes a query linear projection of the spatial feature matrix, $P_K$ denotes a key linear projection of the spatial feature matrix, $P_V$ denotes a value linear projection of the spatial feature matrix, $W_Q$ denotes a query linear transformation matrix learned during training, $W_K$ denotes a key linear transformation matrix learned during training, $W_V$ denotes a value linear transformation matrix learned during training, and the superscript T denotes a transpose operation.

Step (16): Determine the spatial features based on the spatial interaction feature matrix.

Specifically, the first nine rows of the spatial interaction feature matrix $\tilde{P}$ are taken as the output of the entire spatial information encoding process, denoted as spatial features $Y_{spatial} \in \mathbb{R}^{9 \times 64}$, where each row sequentially represents spatial information encoding results of the main vehicle and the eight surrounding background vehicles.

Step (2): Encode the temporal information using the temporal information encoding network to obtain temporal features. The temporal information encoding network is constructed based on a Long Short-Term Memory (LSTM) network and a multilayer perceptron.

Due to the pronounced temporal characteristics of driving behavior, motion trends and behaviors of vehicles in the driving scenario can be better understood with temporal information such as historical trajectories. In the present disclosure, different strategies are applied to encode the temporal information for the main vehicle and the background vehicles to provide features from different perspectives.

On one hand, short-term driving intentions of the main vehicle are extracted from the historical trajectory of the main vehicle in the world coordinate system; on the other hand, the dynamic impact of motion trends of the background vehicles on the driving scenario is extracted from the historical trajectories of the background vehicles in the main vehicle's coordinate system. Although the input features for the main vehicle and background vehicles are the same, their descriptions are based on different coordinate systems. Therefore, two different LSTMs are utilized to encode the temporal features of the main vehicle and the background vehicles separately.

Further, step (2) includes step (21) to step (24).

Step (21): Based on the historical trajectory of the target main vehicle, extract temporal features of the target main vehicle by using a first LSTM network to obtain temporal features of the main vehicle.

Specifically, position and velocity historical trajectories of the target main vehicle in the global coordinate system during the past 5 seconds are input into the first LSTM network to extract the temporal features of the target main vehicle. The historical trajectory of the target main vehicle has a sampling interval of 0.5 seconds.

Step (22): Based on the historical trajectories of the background vehicles, extract temporal features of the background vehicles by using a second LSTM network to obtain temporal features of the background vehicles.

Specifically, position and velocity historical trajectories of the background vehicles in the main vehicle's coordinate system during the past 5 seconds are input into the second LSTM network to extract the temporal features of the background vehicles. The historical trajectories of the background vehicles also have a sampling interval of 0.5 seconds.

Step (23): Concatenate the temporal features of the main vehicle with the temporal features of the background vehicles to obtain concatenated temporal features.

Step (24): Perform nonlinear dimensionality expansion on the concatenated temporal features by using a multilayer perceptron, to obtain the temporal features.

To further enhance the expressive power of temporal features, the present disclosure employs a multilayer perceptron to perform nonlinear dimensionality expansion on the concatenated temporal features, resulting in the output of the temporal information encoding, denoted as temporal features $Y_{Temporal} \in \mathbb{R}^{9 \times 32}$. Each row of the temporal features sequentially represents the temporal information encoding results of the main vehicle and the eight surrounding background vehicles.

In the first LSTM network, an input feature shape is (Batch size, 10, 4), and an output feature shape is (Batch size, 1, 8), with structural parameters being LSTM (4, 8, 1). In the second LSTM network, an input feature shape is (Batch size, 10, 4), and an output feature shape is (Batch size, 1, 8), with structural parameters being LSTM (4, 8, 1). In the multilayer perceptron, an input feature shape is (Batch size, 9, 8), and an output feature shape is (Batch size, 9, 32), with structural parameters being Linear (8, 16)+ReLU+ Linear (16, 32). Batch size refers to the batch size; LSTM (4, 8, 1) denotes an LSTM layer with an input dimension of 4, 8 hidden units, and 1 layer in a neural network; Linear (8, 16) indicates a fully connected layer with an input dimension of 8 and an output dimension of 16 in the neural network; Linear (16, 32) represents a fully connected layer with an input dimension of 16 and an output dimension of 32 in the neural network; ReLU represents a neural network activation function known as a rectified linear unit.

Step (3): Fuse the spatial features and the temporal features using the feature fusion network to obtain spatio-temporal fused features. The feature fusion network is built based on a multi-head self-attention mechanism.

Through step (1) and step (2), the spatial information and the temporal information in the driving scenario can be encoded into $Y_{Spatial}$ and $Y_{Temporal}$. However, since step (1) and step (2) are performed independently, there is no effective correlation established between the encoded results $Y_{Spatial}$ and $Y_{Temporal}$. The multi-head self-attention mechanism can attend to different feature sources by using multiple attention heads simultaneously, offering better diversity, parallelism, and generalization ability. Thus, the present disclosure employs a multi-head self-attention mechanism to realize the fusion of temporal and temporal features.

First, the spatial features $Y_{Spatial}$ and the temporal features $Y_{Temporal}$ are concatenated to form spatio-temporal features $X_{ST}$: $X_{ST}$=Concat($Y_{Spatial}$, $Y_{Temporal}$). Then, each head in the multi-head self-attention mechanism performs fusion on the spatio-temporal features. Finally, the results of each head are concatenated and multiplied by a weight matrix to obtain the spatio-temporal fused features.

A calculation process of each head in the multi-head self-attention mechanism is as follows:

$$head_z = softmax(Q_z K_z^T) V_z;$$

$$Q_z = X_{ST} W_z^Q$$

$$K_z = X_{ST} W_z^K$$

$$V_z = X_{ST} W_z^V$$

where $head_z$ denotes a self-attention fusion result of the z-th head, with z=1, 2 . . . , h, where h is the number of heads in the multi-head self-attention mechanism and is set to 4; $Q_z$ denotes a query linear projection of the spatio-temporal features $X_{ST}$ in the z-th head; $K_z$ denotes a key linear projection of the spatio-temporal features $X_{ST}$ in the z-th head; $V_z$ denotes a value linear projection of the spatio-temporal features $X_{ST}$ in the z-th head; $W_z^Q$ denotes a learned query weight matrix in the z-th head; $W_z^K$ denotes a learned key weight matrix in the z-th head; and $W_z^V$ denotes a learned value weight matrix in the z-th head.

The results of each head are concatenated and multiplied by another weight matrix, to obtain an output result of the multi-head self-attention mechanism:

$$Y = Concat(head_1, head_2, head_3, head_4) W_O;$$

where Y represents the result of the spatio-temporal feature fusion, and $W_O$ represents an output weight matrix that needs to be learned in the multi-head self-attention mechanism; the first row of Y is taken as the spatio-temporal fused features, denoted as $Y_{ST} \in \mathbb{R}^{1 \times 128}$.

Step (4): Decode the spatio-temporal fused features using the feature decoding network to determine the future trajectory sequence of the target main vehicle at the future time points. The feature decoding network is constructed based on a nonlinear dimensionality reduction operation and an LSTM network.

Further, step (4) includes step (41) to step (44).

Step (41): Perform nonlinear dimensionality reduction on the spatio-temporal fused features to obtain first dimension-reduced features.

To decode the spatio-temporal fusion features $Y_{ST}$ into a desired future trajectory sequence of the main vehicle, the initial nonlinear dimensionality reduction needs to be performed, to compress and refine the spatio-temporal fused features $Y_{ST}$ preliminarily, thereby reducing data complexity.

Step (42): Reconstruct a time series for the first dimension-reduced features, and convert the first dimension-reduced features into a two-dimensional matrix with temporal relationships to obtain sequence data.

Specifically, the first dimension-reduced features are one-dimensional vectors. The one-dimensional vectors are transformed into a two-dimensional matrix with temporal relationships through a matrix shape conversion.

Step (43): Perform sequential decoding on the sequence data by using a third LSTM network, to obtain decoded features.

The present disclosure utilizes the powerful modeling capability of the LSTM to perform sequential decoding on the rearranged information.

Step (44): Perform nonlinear dimensionality reduction on the decoded features, and map the decoded features to a target space to obtain the future trajectory sequence of the target main vehicle at the future time points.

Specifically, features that have undergone sequential decoding by the LSTM are subjected to a second nonlinear dimensionality reduction, and are map into a target space with a temporal length of 10 and dimensionality of 2, resulting in the future trajectory sequence of the target main vehicle at future time points.

In the initial nonlinear dimensionality reduction process, an input feature shape is (Batch size, 1, 128), and an output feature shape is (Batch size, 1, 120), with structural parameters being Linear (128, 120)+ReLU. In the time series reconstruction process, an input feature shape is (Batch size, 1, 120), and an output feature shape is (Batch size, 10, 12). In the sequential decoding process, an input feature shape is (Batch size, 10, 12), and an output feature shape is (Batch size, 10, 16), with structural parameters being LSTM (12, 16, 1). In the second nonlinear dimensionality reduction process, an input feature shape is (Batch size, 10, 16), and an output feature shape is (Batch size, 10, 2), with structural parameters being Linear (16, 2)+ReLU.

Figure 3:
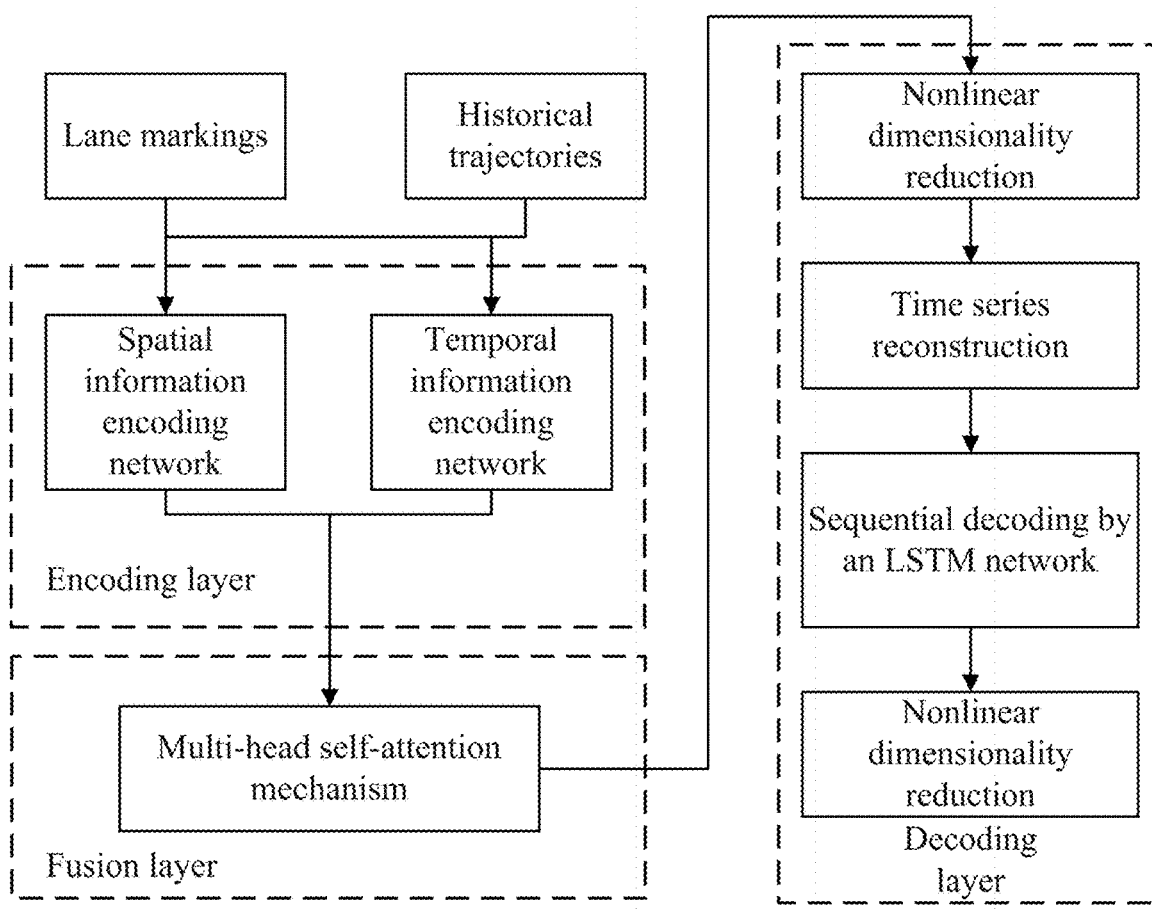
FIG. 3 is a schematic flowchart of a method for driving behavior modeling based on spatio-temporal information fusion according to another embodiment of the present disclosure.

In another exemplary embodiment, as shown in FIG. 3, the driving behavior model constructed in the present disclosure includes an encoding layer, a fusion layer, and a decoding layer.

The encoding layer encodes and extracts features from the information in the lane markings and historical trajectories; spatial features and temporal features are obtained using the spatial information encoding network and the temporal information encoding network, respectively.

The fusion layer employs a multi-head self-attention mechanism to achieve fusion of the spatial features and the temporal features, resulting in spatio-temporal fused features that represent an understanding of the current scene.

The decoder decodes the obtained spatio-temporal fused features to generate the future trajectory sequence.

In an exemplary embodiment, a loss function quantitatively describes the difference between the output results of the driving behavior model and ground truth values, guiding the learning process of the driving behavior model. A dynamic loss function is used during training of the driving behavior model. The core idea is to adaptively adjust weights of a Final Displacement Error (FDE) and an Average Displacement Error (ADE) based on a ratio of the FDE to the ADE during the training process, avoiding excessive focus on one metric in the training process at the expense of overall performance. The loss function of the driving behavior model during training is as follows:

$$Loss=FDE/(\kappa+\omega)+ADE;$$

$$\kappa=FDE/ADE;$$

where Loss denotes a value of the loss function, FDE represents a final trajectory error, indicating an endpoint deviation of a trajectory sequence output by the driving behavior model, ADE represents an average trajectory error, indicating an overall deviation between the trajectory sequence output by the driving behavior model and a real trajectory sequence, k denotes a ratio coefficient, and ω denotes a dynamic loss coefficient, which is set to 1.39.

Figure 4:
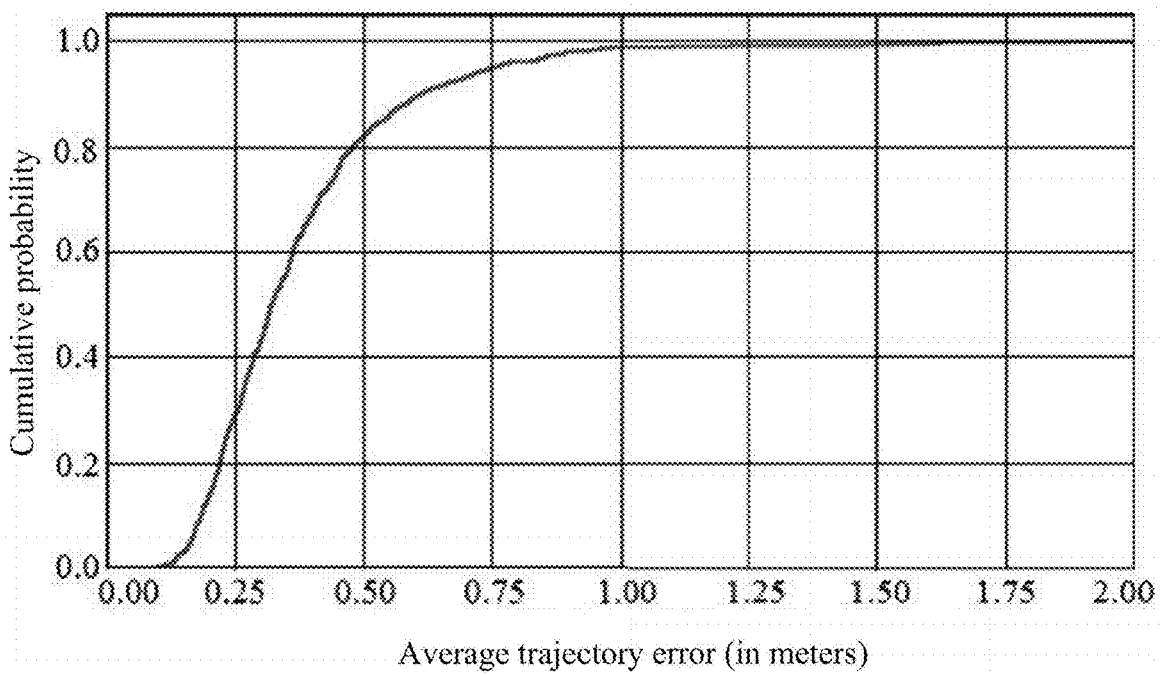
FIG. 4 depicts a cumulative distribution curve of average trajectory error.
Figure 5:
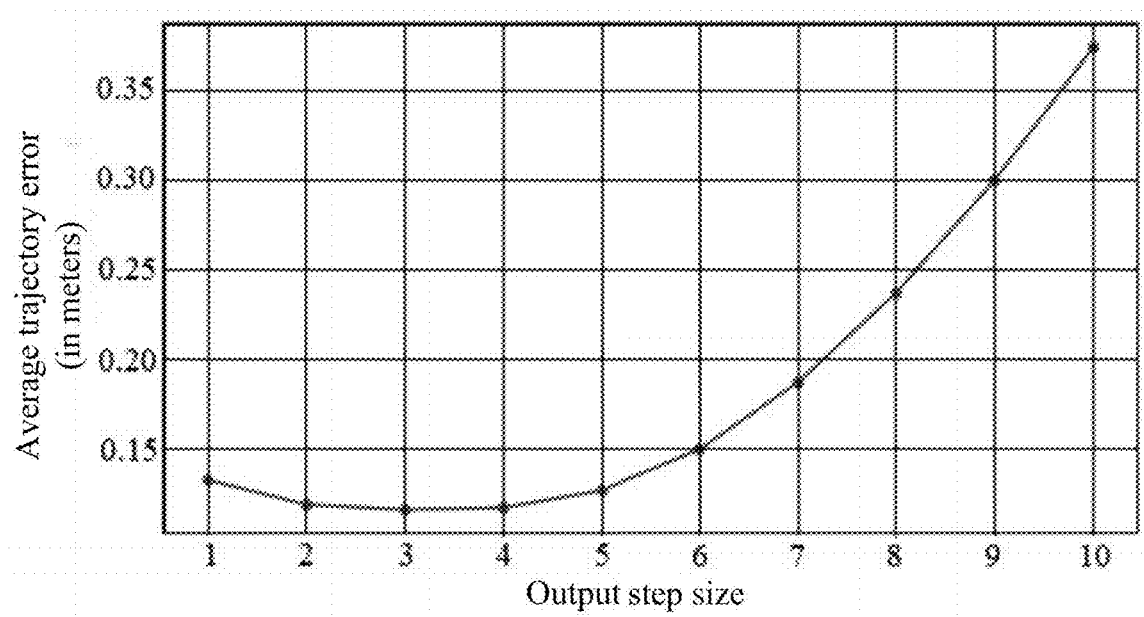
FIG. 5 depicts a curve of average trajectory error vs. output step size.

As shown in FIG. 4 and FIG. 5, when a simulation step size is less than 5 steps, the average trajectory error of the driving behavior model does not change significantly with the increase in the output step size. At this time, the effect of error accumulation on the driving behavior model is minimal, resulting in relatively stable performance during short-time domain simulations. When the simulation step size is 5, the average trajectory error is only 0.13 meters. This indicates that with a smaller error accumulation effect, supported by spatio-temporal information fusion, the driving behavior model has a more comprehensive understanding of the driving scenario, thereby achieving higher prediction accuracy. When the simulation step size exceeds 5, the error of the driving behavior model significantly increases with the output step size. This is mainly due to the presence of a certain error at each simulation step that gradually accumulates. Additionally, with the increase in simulation step size, the dynamic uncertainty in the driving scenario also increases. These unavoidable factors lead to a significant increase in the errors of the driving behavior model during long-time domain simulations. However, when the simulation step size is 10, the average trajectory error of the driving behavior model is controlled at 0.37 meters. Furthermore, from the perspective of a cumulative error distribution curve, when the simulation step size is 10, the driving behavior model has a 90% chance of keeping the average trajectory error below 0.56 meters. The cumulative error distribution curve is overall skewed to the left, indicating that a higher proportion of errors accumulate within a smaller error range, that is, the driving behavior model produces small errors in most cases.

The present disclosure uses an Adam optimizer to adjust relevant parameters of the neural network, with an initial learning rate of 0.0005. After 100 epochs of training, the learning rate decays by 80%, and a total of 600 epochs of training are conducted to obtain the final driving behavior model.

In the present disclosure, the spatial information and the temporal information in the driving scenario are independently encoded and globally fused. The spatial information encoding network and the temporal information encoding network are utilized to extract spatial features and temporal features from the driving scenario, respectively. Based on a multi-head self-attention mechanism, the spatial features and the temporal features are fully fused, to allow the driving behavior model to have a better understanding of the driving scenario. A new dynamic loss function is introduced to improve the performance of the driving behavior model, such that a future trajectory sequence determined by the driving behavior model is more accurate. This capability facilitates better guidance for a target main vehicle in the driving scenario, narrowing the gap between a virtual simulation testing environment and a real driving environment, thereby achieving an accurate replication of human driving behavior and enhancing the accuracy of autonomous driving virtual simulations.

The present disclosure also provides an application scenario that utilizes the aforementioned method for driving behavior modeling based on spatio-temporal information fusion. Specifically, the method for driving behavior modeling based on spatio-temporal information fusion provided by this embodiment can be applied in autonomous driving simulation testing scenarios. In each simulation step of the autonomous driving simulation testing scenario, the driving behavior model provided by this embodiment replaces human drivers in a virtual simulation environment, interacting with the tested autonomous vehicle and predicting the trajectory of the main vehicle, thus improving the accuracy of driving behavior simulations and narrowing the gap between the virtual simulation testing environment and the real driving environment.

Figure 6:
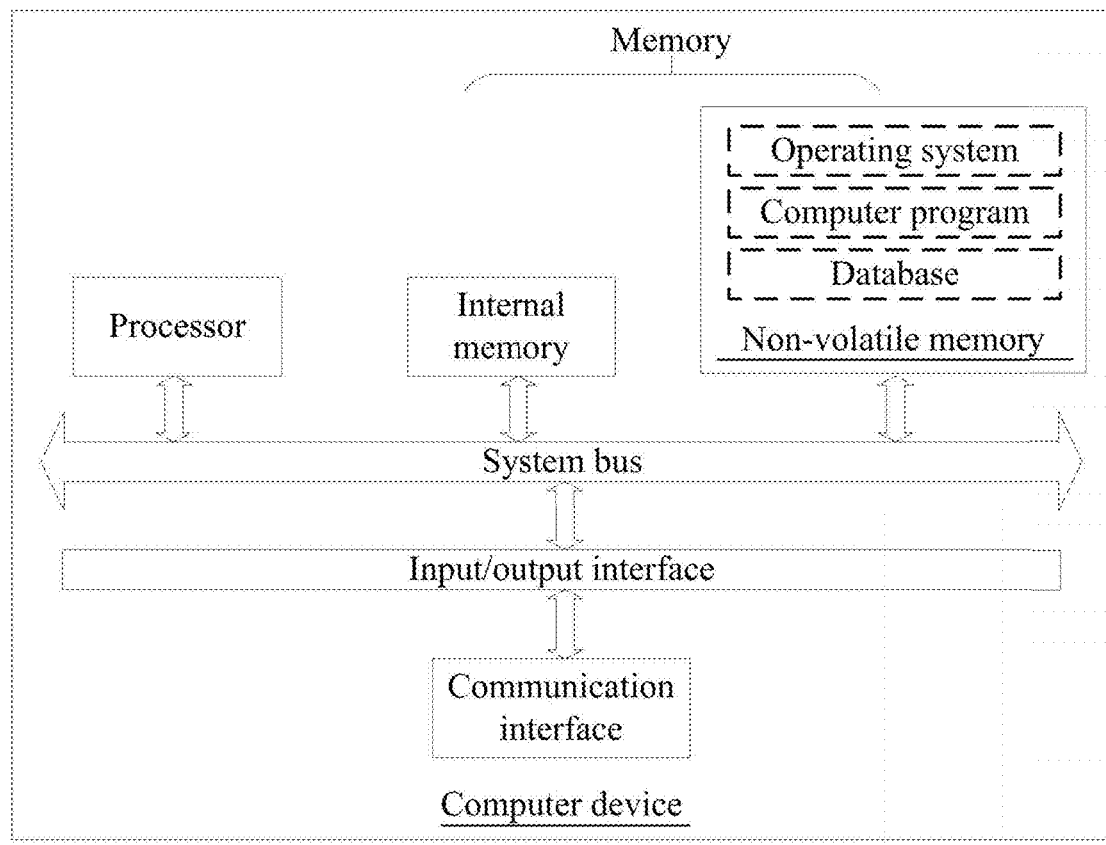
FIG. 6 is a schematic structural diagram of a computer device according to an embodiment of the present disclosure.

In an exemplary embodiment, a computer device is provided. The computer device may be a server or a terminal, and an internal structure thereof may be as shown in FIG. 6. The computer device includes a processor, a memory, an input/output (I/O) interface and a communication interface. The processor, the memory and the I/O interface are connected through a system bus. The communication interface is connected to the system bus through the I/O interface. The processor of the computer device is configured to provide computing and control capabilities. The memory of the computer device includes a non-volatile storage medium and an internal memory. The non-volatile storage medium stores an operating system, a computer program, and a database. The internal memory provides an environment for operation of the operating system and the computer program in the non-volatile storage medium. The database of the computer device is configured to store spatial information and temporal information in a driving scenario. The input/output interface of the computer apparatus is configured to exchange information between the processor and an external device. The communication interface of the computer device is configured to communicate with an external terminal through a network. The computer program is executed by the processor to implement a method for driving behavior modeling based on spatio-temporal information fusion.

Those skilled in the art may understand that the structure shown in FIG. 6 is only a block diagram of a part of the structure related to the solutions of the present disclosure and does not constitute a limitation on a computer device to which the solutions of the present disclosure are applied. Specifically, the computer device may include more or fewer components than those shown in the figure, or combine some components, or have different component arrangements. In an exemplary embodiment, a computer device is provided, including a memory and a processor, where the memory stores a computer program, and the computer program is executed by the processor to implement the steps of the above method embodiment.

In an exemplary embodiment, a computer-readable storage medium is provided. The computer-readable storage medium stores a computer program, and the computer program is executed by a processor to implement the steps of the above method embodiment.

In an exemplary embodiment, a computer program product is provided. The computer program product stores a computer program, and the computer program is executed by a processor to implement the steps of the above method embodiment.

It is to be noted that information of a user (including but not limited to device information of the user, personal information of the user and the like) and data (including but not limited to data for analysis, data for storage, data for exhibition and the like) in the present disclosure are information and data authorized by the user or fully authorized by each party, and relevant data shall be acquired, used and processed according to related regulations.

Those of ordinary skill in the art may understand that all or some of the procedures in the methods of the above embodiments may be implemented by a computer program instructing related hardware. The computer program may be stored in a nonvolatile computer-readable storage medium. When the computer program is executed, the procedures in the embodiments of the above methods may be performed. Any reference to a memory, a database, or other media used in the embodiments of the present disclosure may include a non-volatile and/or volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, etc. The volatile memory may include a random access memory (RAM) or an external cache memory. As an illustration rather than a limitation, the RAM may be in various forms, such as a static random access memory (SRAM) or a dynamic random access memory (DRAM).

The database in the embodiments of the present disclosure may include at least one of a relational database and a non-relational database. The non-relational database may include a distributed database based on a blockchain, but is not limited thereto. The processor in the embodiments of the present disclosure may be a general-purpose processor, a central processor, a graphics processor, a digital signal processor (DSP), a programmable logic device, and a data processing logic device based on quantum computing, but is not limited thereto.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

Several examples are used herein for illustration of the principles and implementations of this application. The description of the foregoing examples is used to help illustrate the method of this application and the core principles thereof. In addition, those of ordinary skill in the art can make various modifications in terms of specific implementations and scope of application in accordance with the teachings of this application. In conclusion, the content of the present specification shall not be construed as a limitation to this application.

The invention claimed is:

1. A method for driving behavior modeling based on spatio-temporal information fusion, comprising:
obtaining a training sample set, wherein each training sample in the training sample set comprises spatial sample information, temporal sample information, and a real trajectory sequence of a sample main vehicle;
constructing a driving behavior model, wherein the driving behavior model comprises a spatial information encoding network, a temporal information encoding network, a feature fusion network, and a feature decoding network; the feature fusion network is connected to both the spatial information encoding network and the temporal information encoding network, and the feature decoding network is connected to the feature fusion network;
training the driving behavior model based on the training sample set to obtain a trained driving behavior model; and
determining a future trajectory sequence of a target main vehicle at future time points based on the trained driving behavior model according to spatial information and temporal information of the target main vehicle, wherein the target main vehicle is controlled to travel according to the future trajectory sequence at the future time points; the spatial information comprises a plurality of elements that contain lane markings, a historical trajectory of the target main vehicle, and historical trajectories of background vehicles; and the temporal information comprises the historical trajectory of the target main vehicle and the historical trajectories of the background vehicles.

2. The method for driving behavior modeling based on spatio-temporal information fusion according to claim 1, wherein said determining the future trajectory sequence of the target main vehicle at the future time points based on the trained driving behavior model according to the spatial information and the temporal information of the target main vehicle specifically comprises:
encoding the spatial information using the spatial information encoding network, to obtain spatial features, wherein the spatial information encoding network is constructed based on a multilayer perceptron, max pooling aggregation operations, and a self-attention mechanism;
encoding the temporal information using the temporal information encoding network to obtain temporal features, wherein the temporal information encoding network is constructed based on a Long Short-Term Memory (LSTM) network and a multilayer perceptron;
fusing the spatial features and the temporal features using the feature fusion network to obtain spatio-temporal fused features, wherein the feature fusion network is built based on a multi-head self-attention mechanism; and
decoding the spatio-temporal fused features using the feature decoding network to determine the future trajectory sequence of the target main vehicle at the future time points, wherein the feature decoding network is constructed based on a nonlinear dimensionality reduction operation and an LSTM network.

3. The method for driving behavior modeling based on spatio-temporal information fusion according to claim 2, wherein said encoding the spatial information using the spatial information encoding network, to obtain the spatial features specifically comprises:
determining a plurality of node vectors for each element, wherein each node vector comprises a starting position, an ending position, element attributes, and an element index;
for any given element, connecting the node vectors of the element sequentially to obtain a polyline subgraph of the element;
based on the multilayer perceptron and max-pooling aggregation operations, extracting features from the polyline subgraph of each element to obtain a polyline subgraph feature vector of each element;

concatenating the polyline subgraph feature vectors of all elements to obtain a spatial feature matrix;

extracting global interaction features of the spatial feature matrix using a self-attention mechanism, to obtain a spatial interaction feature matrix; and determining the spatial features based on the spatial interaction feature matrix.

4. The method for driving behavior modeling based on spatio-temporal information fusion according to claim 3, wherein said determining a plurality of node vectors for each element specifically comprises:

selecting a plurality of key points according to the lane marking in a vehicle travel direction, to obtain a plurality of node vectors for the lane marking;

based on the historical trajectory of the target main vehicle, selecting a plurality of key points according to a time dimension to determine a plurality of node vectors for the target main vehicle; and based on the historical trajectory of the background vehicle, selecting a plurality of key points according to the time dimension to determine a plurality of node vectors for the background vehicle.

5. The method for driving behavior modeling based on spatio-temporal information fusion according to claim 3, wherein the polyline subgraph feature vector of the j-th element is determined using the following formulas:

$$v_{i,j}^{(l)} = \varphi_{rel}(g_{enc}(v_{i,j}^{(l-1)}), \varphi_{agg}(\{g_{enc}(v_{:,j}^{(l-1)})\}));$$

$$\tilde{p}_j = \varphi_{agg}(\{g_{enc}(v_{:,j}^{(3)})\})$$

wherein $v_{i,j}^{(l)}$ denotes the i-th node vector in the polyline subgraph of the j-th element at the l-th layer of a subgraph feature extraction network; $v_{i,j}^{(l-1)}$ denotes the i-th node vector in the polyline subgraph of the j-th element at the (l−1)-th layer of the subgraph feature extraction network; $v_{:,j}^{(l-1)}$ denotes all node vectors in the polyline subgraph of the j-th element at the l-th layer of the subgraph feature extraction network, wherein l=1,2,3; the node vectors in the polyline subgraph of the j-th element at the 0-th layer of the subgraph feature extraction network are the node vectors in the polyline subgraph of the j-th element; $\tilde{p}_j$ denotes the polyline subgraph feature vector of the j-th element; $g_{enc}(\cdot)$ represents a node encoding network, which is realized by a multilayer perceptron with the same structure but different parameters at each layer of the subgraph feature extraction network; $\varphi_{agg}(\cdot)$ represents max pooling aggregation across all adjacent node vectors, and $\varphi_{rel}(\cdot)$ represents a concatenation operation.

6. The method for driving behavior modeling based on spatio-temporal information fusion according to claim 2, wherein said encoding the temporal information using the temporal information encoding network to obtain the temporal features specifically comprises:

based on the historical trajectory of the target main vehicle, extracting temporal features of the target main vehicle by using a first LSTM network to obtain temporal features of the main vehicle;

based on the historical trajectories of the background vehicles, extracting temporal features of the background vehicles by using a second LSTM network to obtain temporal features of the background vehicles;

concatenating the temporal features of the main vehicle with the temporal features of the background vehicles to obtain concatenated temporal features; and performing nonlinear dimensionality expansion on the concatenated temporal features by using a multilayer perceptron, to obtain the temporal features.

7. The method for driving behavior modeling based on spatio-temporal information fusion according to claim 2, wherein said decoding the spatio-temporal fused features using the feature decoding network to determine the future trajectory sequence of the target main vehicle at the future time points specifically comprises:

performing nonlinear dimensionality reduction on the spatio-temporal fused features to obtain first dimension-reduced features;

reconstructing a time series for the first dimension-reduced features, and converting the first dimension-reduced features into a two-dimensional matrix with temporal relationships to obtain sequence data;

performing sequential decoding on the sequence data by using a third LSTM network, to obtain decoded features; and performing nonlinear dimensionality reduction on the decoded features, and mapping the decoded features to a target space to obtain the future trajectory sequence of the target main vehicle at the future time points.

8. The method for driving behavior modeling based on spatio-temporal information fusion according to claim 1, wherein a loss function of the driving behavior model during training is as follows:

Loss=FDE/(κ+ω)+ADE;

κ=FDE/ADE wherein Loss denotes a value of the loss function, FDE represents a final trajectory error, indicating an end-point deviation of a trajectory sequence output by the driving behavior model, ADE represents an average trajectory error, indicating an overall deviation between the trajectory sequence output by the driving behavior model and a real trajectory sequence, κ denotes a ratio coefficient, and ω denotes a dynamic loss coefficient.

9. The method for driving behavior modeling based on spatio-temporal information fusion according to claim 1, wherein both the sample main vehicle and the target main vehicle are real vehicles.

10. The method for driving behavior modeling based on spatio-temporal information fusion according to claim 1, wherein the sample main vehicle is a real vehicle, the trained driving behavior model is connected to a virtual simulation platform to determine the future trajectory sequence of the target main vehicle, as a virtual vehicle, at the future time points; the virtual simulation platform controls the target main vehicle to travel according to the future trajectory sequence at the future time points.

* * * * *